Dec. 31, 1929.   F. H. HOY   1,741,239
SAUSAGE CASING
Filed March 5, 1928
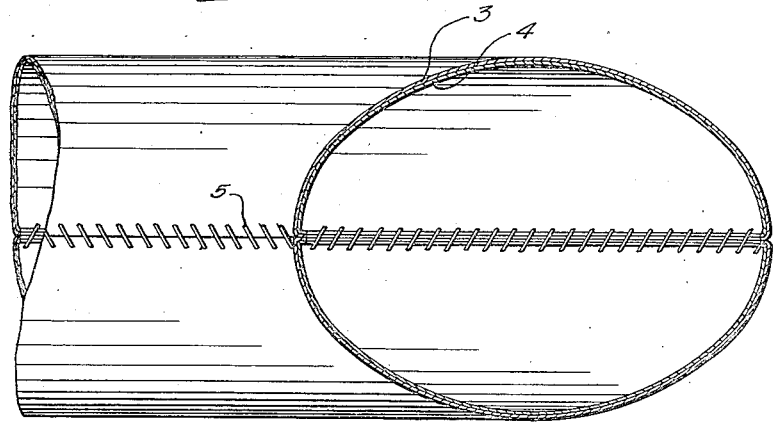
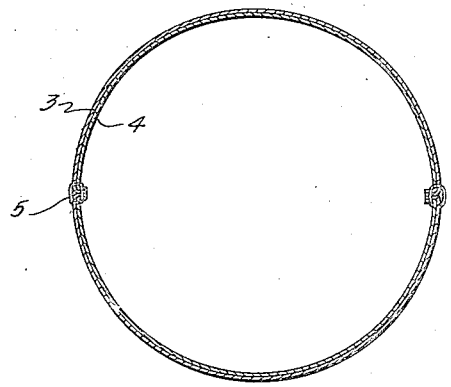
INVENTOR.
Frank H. Hoy
BY
Louis O. French
ATTORNEY.

Patented Dec. 31, 1929

1,741,239

UNITED STATES PATENT OFFICE

FRANK H. HOY, OF MILWAUKEE, WISCONSIN, ASSIGNOR TO CUDAHY BROTHERS COMPANY, OF MILWAUKEE, WISCONSIN, A CORPORATION OF WISCONSIN

SAUSAGE CASING

Application filed March 5, 1928. Serial No. 259,313.

The invention relates to sausage casings.

In making casings for certain kinds of sausage it is usual to make these casings from a relatively weak and fatty intestinal material, such as hog intestines, and as an example so-called "Genoa" sausage has casings of this character made from "hog bung". These casings are very tender and expensive and considerable waste results during manufacture. I have attempted to improve this condition by using another layer of the same material but this increased the expense and did not produce the desired product. The object of this invention is to improve casings of this character and I have found that a superior sausage casing is obtained by reinforcing the more tender outside casing layer with an inner layer formed of a relatively strong and tough casing material, such as a beef middle, whereby the appearance of the casing is not impaired and other advantages hereinafter mentioned are obtained.

The invention further consists in the several features hereinafter set forth and more particularly defined by claims at the conclusion hereof.

In the drawings Fig. 1 is a view of a portion of the casing embodying the invention, showing it in open condition;

Fig. 2 is a detail sectional view taken on the line 2—2 of Fig. 1.

In carrying out my invention I take a piece of the relatively weak casing material 3, such as hog bung, and associate it with a piece of relatively strong casing material 4, such as beef middle, and secure two or more pieces of this composite material together to form the completed casing by stitching 5. This composite material is prepared in a manner similar to that used in making single casing except that the casing pieces are initially blown up, together, and is made as usual in a baglike form, the parts of the casing being stitched together, working from the outside at the sides and bottom, and the completed casing is then turned inside out, leaving the hog bung on the outer side and the beef middle on the inner side. The casing is then filled from its open end and thereafter tied to form the completed product.

I find that a casing formed as above described makes a much stronger casing than any heretofore used; that it takes less time to dry the casings, as the beef middle dries quickly; there is less breakage on the stuffing bench, which with the old style of casing sometimes runs as high as thirty per cent; the product is improved because the meat can be stuffed tighter, thereby avoiding pin holes and air holes in the finished product; the casing is cheaper; the raw material is easier to obtain; and the appearance of the product is not changed.

I desire it to be understood that this invention is not to be limited to any specific casing material or manner of making the casing except in so far as such limitations are specified in the claims.

What I claim as my invention is:

1. As a new article of manufacture, a sausage casing comprising an outer layer of relatively weak and fatty intestinal casing material and an inner layer of relatively strong intestinal casing material secured together to form the casing.

2. As a new article of manufacture, a sausage casing comprising an outer layer of fatty intestinal casing material and an inner layer of strong, quick-drying intestinal casing material secured together to form the casing.

In testimony whereof, I affix my signature.

FRANK H. HOY.